Dec. 5, 1939.  W. H. BUCHHAGEN  2,182,688
PARING MACHINE
Filed Oct. 12, 1936   2 Sheets-Sheet 1
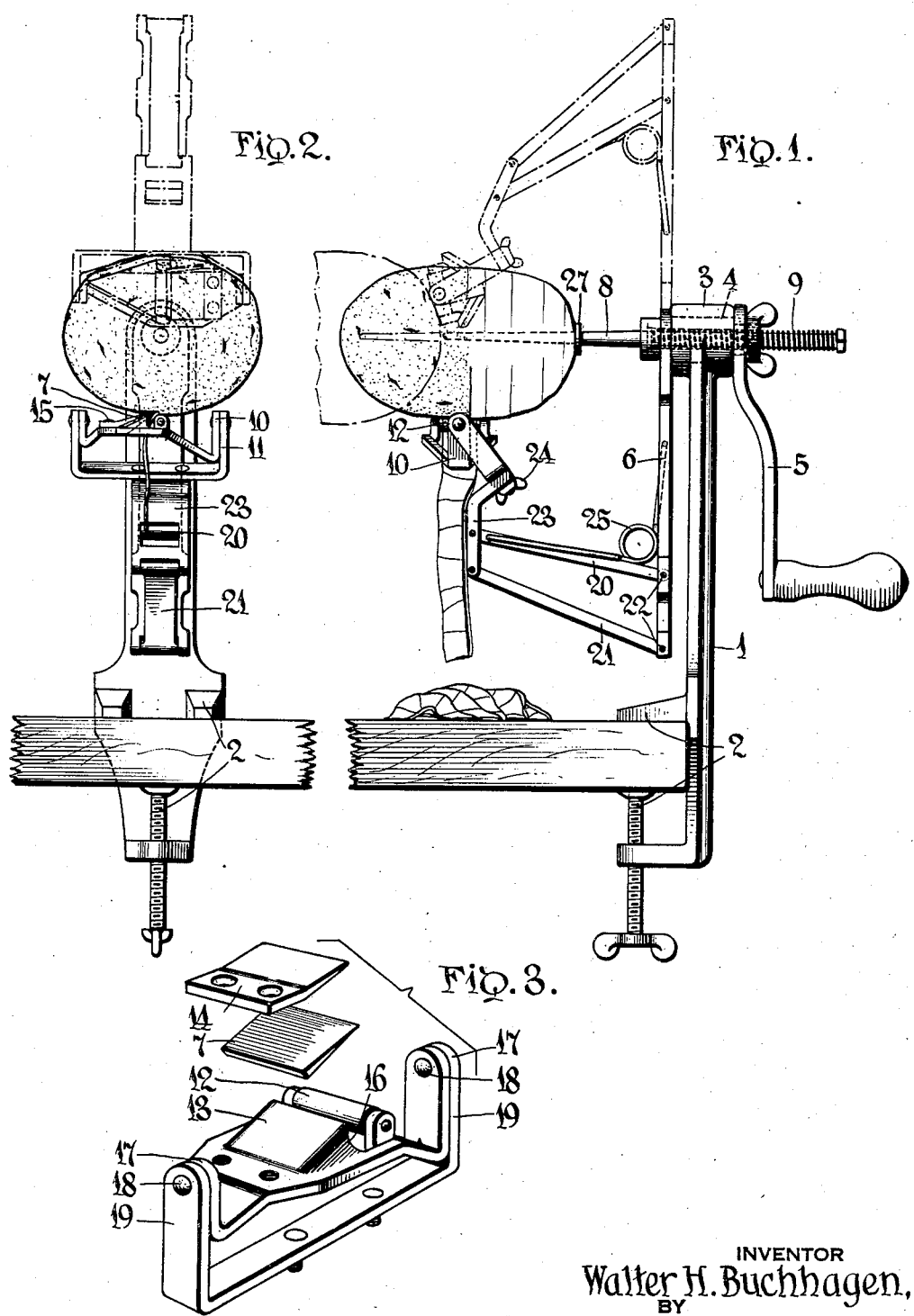
INVENTOR
Walter H. Buchhagen,
BY
Beau, Brooks, Buckley & Beau.
ATTORNEYS Dec. 5, 1939.   W. H. BUCHHAGEN   2,182,688
PARING MACHINE
Filed Oct. 12, 1936   2 Sheets-Sheet 2
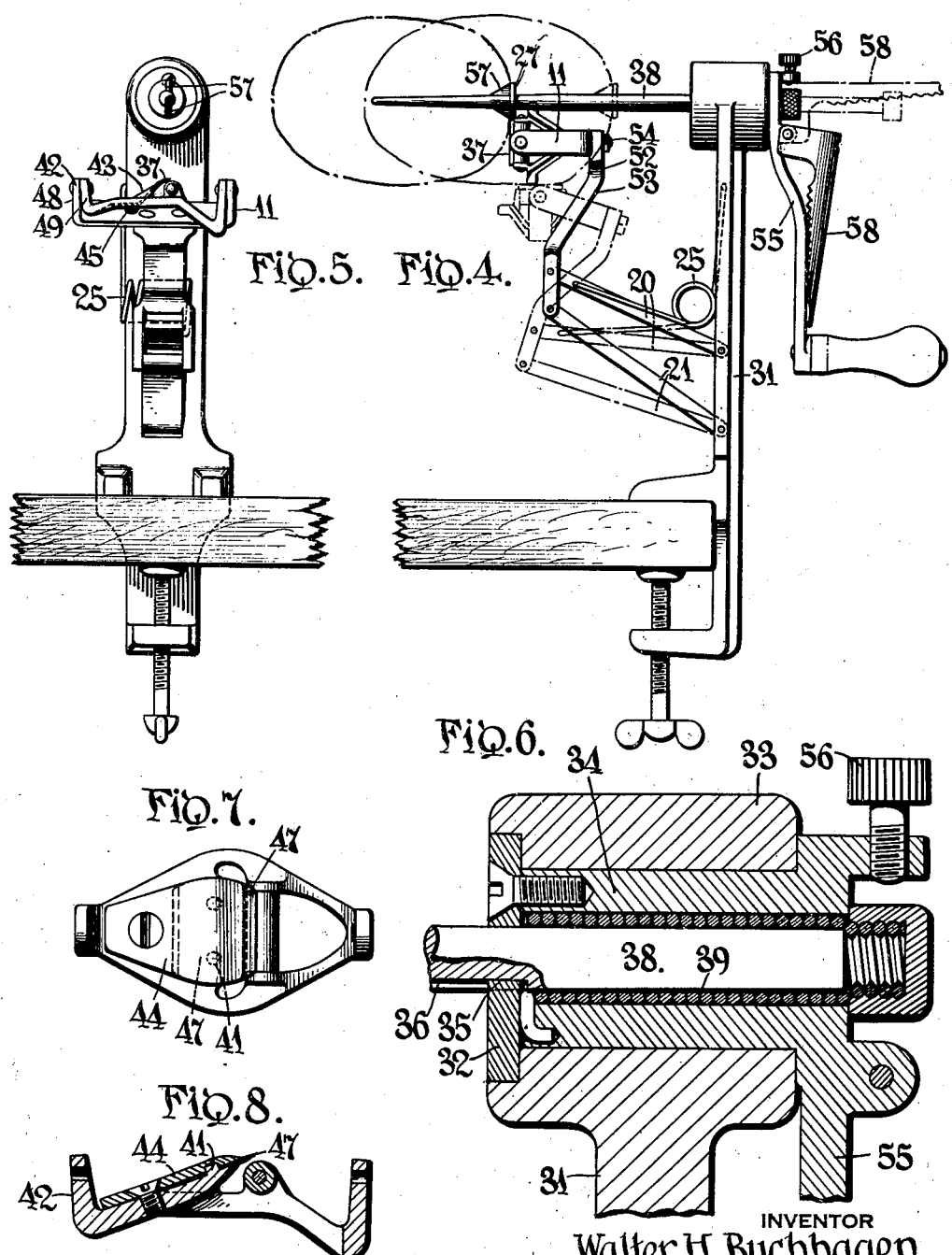
INVENTOR
Walter H. Buchhagen,
BY
Beau, Brooks, Buckley & Beau.
ATTORNEYS Patented Dec. 5, 1939

2,182,688

UNITED STATES PATENT OFFICE 2,182,688

PARING MACHINE

Walter H. Buchhagen, Buffalo, N. Y.

Application October 12, 1936, Serial No. 105,339

11 Claims. (Cl. 146—43)

This invention relates to a vegetable paring machine or implement, and is especially designed as a kitchen utensil for the paring of potatoes in the home.

Various devices and attempts have been made to produce a satisfactory potato parer suitable for use in the home. The irregular shape of the potato has made it difficult to pare the same by mechanical means. Mechanical means heretofore employed or devised have not possessed sufficient flexibility to avoid gouging into the potato or removing a thicker paring than is desired for economy.

The present invention has for its object to provide a paring machine which is especially adapted for peeling the potato in all of its various and odd shapes with as little waste as possible, and at the same time enabling the vegetable to be peeled in an expeditious manner, the term potato being used herein to include other vegetables and fruits which may be peeled for domestic use.

The invention further has for its object to provide means by which the paring knife or cutter is presented to the potato in a manner to permit the cutting edge a freedom of movement by which it may readily follow and adapt itself to the irregular surface contour of the potato without obstruction and interference by the potato during the paring operation.

In the drawings

Fig. 1 is a side elevation of a potato paring machine constructed in accordance with the present invention;

Fig. 2 is a front elevation of the machine;

Fig. 3 is an exploded view of a portion of the blade support;

Figs. 4 and 5 are respectively views similar to Figs. 1 and 2 showing a modified form of the invention;

Fig. 6 is a detailed sectional view thereof; and

Figs. 7 and 8 are respectively plan and longitudinal sectional views of a further embodiment of the blade support.

Referring more particularly to the drawings, numeral 1 designates a standard which may be conveniently attached to an overhanging ledge of a table, as by means of the clamping arrangement generally indicated at 2. The standard is provided with a bearing 3 in which is journalled a tubular shaft 4 and on this shaft is fixed a crank handle 5, by which the shaft may be turned, and also a radially disposed cutter operating arm 6 which carries on its outer end the cutter 7. As the crank handle 5 is rotated the paring cutter or blade 7 will likewise be revolved in a path about the potato, the latter being supported upon an advancing holder 8 which is herein disclosed as being in the form of a spike that has sliding support in the tubular shaft 4 and is yieldably projected as by means of a spring 9. The spring may be of the coiled type and have one end anchored, as to the tubular shaft 4, and the opposing end connected to the potato supporting member 8 so that the potato may be moved axially of the cutter path as the paring progresses. Such advancing movement of the potato may be imparted thereto by suitable mechanical means, if desired, but to simplify the machine for home use the potato is held by the hand from rotating and through the potato the holder is also constrained against turning.

In the modification of Figs. 4, 5 and 6, the cutter supporting arm is non-rotatable or fixed and the potato holder rotated. To this end the arm is combined with the standard 31 and thereon is supported the cutter 37. The potato holder 38 is connected to the tubular shaft 34 by a collar 32 which also serves to secure the latter in its journal bearing 33 of the standard. The collar has a feather 35 slidably engaging in a longitudinal groove 36 of the spike so as to connect drivingly the two parts while permitting receding movement of the spike against the tension of the spring 39.

As the paring progresses spirally about the potato, the cutter will recede and advance as well as laterally rock as it follows the irregular surface contour of the vegetable. To this end the paring blade 7 is supported by a cradle 10 which is pivotally hung on a carrier 11 in such a manner as to support the blade for rocking about an axis substantially tangential to its orbital path and normal to its cutting edge. This serves to support the cutting edge for lateral rocking on the irregular surface of the potato as it advances into the path of the cutting edge. A depth gauging roller 12 is offset slightly in advance of the cutting edge away from the potato so as to determine the thickness of the paring. The blade is adjustable on a shelf 13 of the cradle and is clamped in its proper position by the removable jaw 14 which is attached to the cradle by suitable means, such as screws 15. The cutting edge may be adjusted from the roller by inserting a shim (not shown) thereunder, if desired. The potato peel is discharged through the opening 16 between the shelf 13 and the roller 12.

In the illustrated form of the invention the cradle is given a suspension form of mounting, being suspended by a pair of hangers 17 from the pivots 18 which in turn serve to connect the cradle to the opposing fingers 19 of the yoke-like carrier 11. The center of gravity of the cradle is preferably below the pivotal axis 18 so that the cradle will normally gravitate to an upright position when on the lower side of the potato. The cutting or paring edge of the cutter is disposed substantially in the plane of the axis 18. This permits the cutting edge to rock readily on such axis, which is substantially parallel to and in the plane of paring, without gouging the potato. To peel extensive flat surface portions of the potato it may be desirable to raise the cutting edge slightly above this axis, as depicted in Fig. 2. This will avoid the suspension parts 17 and 19 coming into contact with the potato.

The cutter 37 (Fig. 4) may be secured to the underside of the shelf 43 by screw 45, or the cutter may be in the form of a razor blade, as shown at 47 in Figs. 7 and 8, fitting over positioning lugs 41 and being secured by the removable plate 44. The angular movement of the cradle may be limited by suitable stop means provided as by deflecting the contacting faces 42 of the suspending arms 48 and 49 (Figs. 5 and 8). This angular deflection will cause the faces to bind if the cradle is swung in more than a predetermined arc, but within such arc it swings freely so that the knife or cutter will readily follow the potato contour.

The cutter is given support for movement in a predetermined path on the rotating arm 6 in Fig. 1, or on the fixed arm or standard 31 in Fig. 4, so as to insure the cutter being properly and freely presented to the potato, and at the same time to dispose the carrier away from the potato to avoid interference thereby during the peeling operation. According to the disclosure in Fig. 1, this support comprises a pair of links 20 and 21 which are pivotally supported at 22 on the outer end of the arm 6 to extend laterally therefrom. The outer ends of these links are connected at spaced points to a floating support 23 on which is mounted the carrier 11, the connection between these two parts being preferably detachable. To facilitate this, the support 23 is bent at an angle and perforated to receive one or more screws of the carrier, the wing nuts 24 engaging the screws to clamp the carrier to its support. This will permit the carrier with its blade supporting cradle being readily removed for washing after use.

In Fig. 4 the links 20 and 21 are pivoted on the standard 31 and carry the floating support 53 for the cradle carrier 11. In this embodiment the support is extended and deflected at 52 to afford proper clearance for better discharge of the paring, the carrier being detachably mounted by the nut 54.

The support is urged by a spring 25 to hold the paring cutter normally at its innermost position so as to cause the cutter to begin its paring operation at the foremost end portion of the potato as the latter is fed into the path of the cutter, and at the same time permitting the blade to yield outwardly for accommodating the increasing diameter of the vegetable. In this respect it will be noted that the support causes the cutter to recede from the potato support in a path which is nearly radial thereof, moving closer to the arm 6 or standard 31 with a slight inward arc. This is due to the lower link 21 being slightly longer than link 22 and inclined relative thereto. Thus the pushing or feeding of the potato against the cutter causes the latter to recede to accommodate the increasing diameter of the vegetable. This controlled action further serves to hold the carrier from hindering contact with the potato.

In operation, a potato is placed upon the supporting member 8 and preferably held by the hand. As the handle in Fig. 1 is turned to rotate the cutter about the holding member 8 and its supported potato, or in Fig. 4 as the holder 38 is turned to rotate the potato, the latter is pushed inwardly to come into contact with the cutting edge. The cutter support yields outwardly against the spring 9 (39) as the cutting edge advances spirally over the increasing diameter of the potato. In practice it is preferred to pare about one-half of the potato and then reverse the latter on its support for the finishing operation. The cutting edge will readily adapt itself to the irregular contour of the surface of the potato, rocking about its pivotal axis 18 as well as yielding outwardly to shave off a thin and comparatively wide paring, and consequently the potato is quickly peeled with a minimum amount of waste. A shoulder 27 may be provided on the holder 8 to limit penetration of the latter into the vegetable, and where the potato is rotated such holder may be provided with cleats 57 to clutch the potato.

To facilitate removal of the potato eyes a pointed cutter 58 may be provided. This may be pivoted for movement from a protected position and as a convenient mounting it is shown as being folded on the handle 55 and adapted for swinging to the dotted operative position where it is secured by a set screw 56.

While the apparatus or machine described and shown herein is merely illustrative of the inventive principles involved, it will be understood that such principles may be applied to other physical embodiments without departing from the scope and spirit of the invention claimed.

I claim:

1. A paring machine comprising potato supporting means including a potato impaling member and a bearing therefor, paring means comprising a cutter supported for movement toward and away from said impaling member, resilient means urging said cutter toward said impaling member and means for imparting a defined rotary movement to said cutter in its movements toward and away from said potato impaling member, said paring means being mounted for rotation about the axis of said impaling member, and means for imparting a rotary motion thereto.

2. A paring machine comprising potato supporting means including a potato impaling member and a bearing therefor, paring means comprising a rockable cutter carried by a link member and a pair of spaced links pivotally connected at their opposite ends to said link member and said supporting means respectively, said paring means being mounted for rotation about the axis of said impaling member, and means for imparting a rotary motion thereto.

3. A paring machine comprising potato supporting means, a straight edged paring cutter, and means for movably supporting said cutter, said cutter and said potato supporting means being relatively rotatable whereby said cutter may be advanced along the surface of the potato, said cutter being disposed with its cutting edge extending approximately at right angles to its path of movement, said movable supporting means comprising a cutter head having said cutter arranged thereon and a pair of pivotal supports for said cutter head, one of said pivotal supports being disposed in advance of said paring cutter with respect to its relative path of movement and the other pivotal support being disposed behind said cutter head with respect to its relative path of movement.

4. A paring machine comprising article supporting means, a straight edged paring cutter, means for supporting said cutter against an article to be pared, and means for causing relative movement between the paring cutter and the article to be pared, said supporting means comprising a cutter head having said cutter attached thereto and a U-shaped supporting member for said cutter head, the cutter head extending between the opposed walls of said U-shaped member and pivotally secured at its opposite ends to each of them in such manner that the cutter is disposed between said pivot points with its cutting edge normal to the axis of said pivot points.

5. A paring machine comprising article supporting means, a straight edged paring cutter, means for supporting said cutter against an article to be pared and means for causing relative movement between the paring cutter and the article to be pared, said cutter supporting means comprising a cutter carrying element having trunnions at its opposite ends and cradle means for receiving said trunnions to support said cutter and cutter carrying element for pivotal movement, the axis of said trunnions extending substantially at right angles to the cutting edge of said cutter.

6. A paring machine comprising article supporting means, paring means, and means for rotating one of said means relative to the other for taking a paring cut from an article to be pared, said paring means comprising a paring cutter and a support therefor comprising a cradle for supporting said cutter having pivot bearings on opposite sides of said cutter for pivotal movement of said paring cutter on an axis normal to the cutting edge of said blade.

7. A paring machine comprising article supporting means, paring means, and means for rotating one of said means relative to the other for taking a paring cut from the article to be pared; said paring means comprising a paring cutter and a holder therefor having pintle disposed on opposite sides of said paring cutter and a support having hearing means for said pintle portions for pivotally mounting said holder for movement about an axis transverse to the cutting edge of said paring cutter.

8. A paring machine comprising article supporting means, paring means, and means for rotating one of said means relative to the other for taking a paring cut from the article to be pared; said paring means comprising a paring cutter and a cradle support therefor pivotally supporting said cutter on opposite sides thereof, the axis of said pivotal support extending transversely through and at right angles to the cutting edge of the paring cutter.

9. A paring machine comprising a potato supporting means having a longitudinal axis, a straight edged paring cutter, means supporting the cutter for free but limited rocking movement about an axis lying substantially in the plane and direction of paring, and means for supporting the cutter supporting means for yielding toward and from the potato and for simultaneously imparting to said cutter and said cutter supporting means a defined rotary movement about the axis of said potato supporting means and concentric therewith, said potato supporting means and said cutter being relatively movable for disposing the potato against the cutter for paring.

10. A paring machine comprising a potato supporting means having a longitudinal axis, a paring cutter, means mounting the potato supporting means and cutter for relative rotary movement one about the other, means supporting the cutter for free but limited rocking movement about an axis substantially normal to the cutting edge, means for supporting the cutter on said mounting means and for simultaneously imparting to said cutter a defined rotary movement about the axis of said potato supporting means and concentric therewith and embodying spring means for yieldably holding such supporting means in one position, and means removably attaching the cutter to said last mentioned supporting means.

11. A paring machine comprising article supporting means, a straight edged paring cutter, means for supporting said cutter against an article to be pared, and means for causing relative movement between the paring cutter and the article to be pared, said cutter supporting means comprising a cutter carrying element, cradle means for said carrying element, said cutter carrying element having means fixedly securing the cutter thereto, and means pivotally connecting the cutter carrying element to the cradle means, said pivotally connecting means having its pivotal axis disposed normal to and between the ends of the straight edge of the cutter with such axis being substantially in the plane of the cutting edge and in the direction of paring whereby the cutter may rock about such pivotal axis to cause the opposite ends of the cutter edge to rise and fall with respect to the intermediate edge portion.

WALTER H. BUCHHAGEN.

CERTIFICATE OF CORRECTION.

Patent No. 2,182,688.  December 5, 1939.

WALTER H. BUCHHAGEN.

It is hereby certified that error appears in the printed specification of the above numbered patent requiring correction as follows: Page 2, first column, line 41, for "evtend" read extend; page 3, first column, line 41, claim 6, before the word "on" insert disposed; line 49, claim 7, after "pintle" insert portions; and line 51, same claim, for "hearing" read bearing; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.